United States Patent [19]

Kanbayashi et al.

[11] Patent Number: 5,218,708

[45] Date of Patent: Jun. 8, 1993

[54] VIDEOTEXT COMMUNICATION NETWORK WITH A RECEIVING TERMINAL THAT AUTOMATICALLY PREFORMS OPERATIONS TO NETWORK RESPONSIVE TO PREDETERMINED SCHEDULE

[75] Inventors: Yoshiyuki Kanbayashi; Tadahiko Nakao, both of Tokyo; Yasuo Koiwai; Shigeyuki Shimauchi, both of Tokyo; Tetsuro Sato, Hino; Yasuo Misawa, Kamakura; Youichi Suzuki; Touru Uruno, both of Mitaka; Masayuki Doi, Mitaka; Shigeru Suzuki; Susumu Miyamoto, both of Tokyo, all of Japan

[73] Assignees: Zaidanhouzin Kasenzyouho-Senta; Hitachi, Ltd., both of Tokyo; Kabushiki Kaisha Toshiba, Kanagawa; Mitsubishi Denki Kabushiki Kaisha; Nihon Musen Kabushiki Kaisha, both of Tokyo; Fujitsu Limited, Kanagawa, all of Japan

[21] Appl. No.: 423,966

[22] Filed: Oct. 18, 1989

[51] Int. Cl.$^5$ .................. H04N 7/12; H04N 7/173
[52] U.S. Cl. .................. 395/800; 395/200; 395/600; 364/DIG. 1; 364/222; 364/238.5
[58] Field of Search .......... 395/800, 600, 200; 360/9.1; 358/142

[56] References Cited

U.S. PATENT DOCUMENTS 4,787,063  11/1988  Muguet ........................ 360/9.1
4,814,972  11/1986  Winter et al. ................. 395/200
4,928,177  4/1988  Martinez ....................... 358/142

FOREIGN PATENT DOCUMENTS 64-18381  1/1989  Japan .
64-18383  1/1989  Japan .
64-18385  1/1989  Japan .
64-19390  1/1989  Japan .

OTHER PUBLICATIONS

Kumamto et al. "Captain" System Jul., 1980; *Japan Telecommunication Review.*

Primary Examiner—Thomas C. Lee
Assistant Examiner—L. Donaghue
Attorney, Agent, or Firm—Frishauf, Holtz, Goodman & Woodward

[57] ABSTRACT

An automatic information receiving terminal device in a character/graphic information network system including a videotex communication network or a public communication network (telephone network) is connected to an information center through the videotex or public communication network so that various items of image information from the information center can be received by the terminal device. The terminal device having an internal clock and a time setting unit. The terminal device can automatically receive or reproduce desired information at an each time preset by the time setting means, so that the terminal device can automatically be operated without manual intervention so as to give emergency information or the like timely to a number of people.

8 Claims, 4 Drawing Sheets

FIG.3

TABLE OF AUTOMATIC REQUESTS

| | REQUEST TIME | REQUEST PACK NUMBER | | REQUEST TIME | REQUEST PACK NUMBER |
|---|---|---|---|---|---|
| 1 | 9:15 | 1.2.5 | 13 | 17:05 | 2. |
| 2 | 9:45 | 4. | 14 | 17:20 | 5. |
| 3 | 10:15 | 3. | 15 | 17:45 | 1.3.6 |
| 4 | 12:00 | 6. | 16 | 18:05 | 6. |
| 5 | 12:30 | 3. | 17 | 18:20 | 4. |
| 6 | 13:05 | 1.2.5 | 18 | 18:30 | 3. |
| 7 | 14:30 | 4. | 19 | | |
| 8 | 14:45 | 3. | 20 | | |
| 9 | 15:05 | 6. | 21 | | |
| 10 | 15:30 | 2. | 22 | | |
| 11 | 16:30 | 1. | 23 | | |
| 12 | 16:45 | 5. | 24 | | |

PRESET PACKED REQUESTS

| REPRODUCTION SEQUENCE REGISTER TABLE | | |
|---|---|---|
| REPRODUCTION SEQUENCE | FILE NUMBER | SPEECH MESSAGE NUMBER |
| 0 1 | 0 3 | 0 1 |
| 0 2 | 4 0 | |
| 0 3 | 0 2 | 0 2 |
| 0 4 | 0 1 | 0 3 |
| ⋮ | ⋮ | ⋮ |
| 4 2 | 0 5 | 0 7 |

VIDEOTEXT COMMUNICATION NETWORK WITH A RECEIVING TERMINAL THAT AUTOMATICALLY PREFORMS OPERATIONS TO NETWORK RESPONSIVE TO PREDETERMINED SCHEDULE

BACKGROUND OF THE INVENTION

The present invention relates to an automatic information receiving terminal device for use in a character/graphic information network system which utilizes a videotex communication network or the like, and more particularly to an automatic information receiving terminal device for use in a character/graphic information network system which can provide users or subscribers with necessary information through a videotex communication network having an information center that includes a data base accessible by the subscribers through a public communication network (telephone network), the automatic information receiving terminal device having a clock means and a time setting means, the arrangement being such that the automatic information receiving terminal device can automatically be started under the control of the clock means and the time setting means, thereafter automatically receive desired information from the information center, and display the received information in a predetermined sequence or produce speech signals based on the received information.

In order to meet more sophisticated and diverse social needs based on the recent rapid progress of electronic technology, much attention is being paid to visual image communications having a variety of functional features. As one of such visual image communication systems, a character/graphic information network system such as a videotex system or the like provides an information retrieval service by which the data base of an information center can be accessed through a communication network from a user's terminal including a display unit so that a vast amount of information stored in the data base can easily be utilized by the user. Incorporating the advanced computerized image processing capability which enables images to be updated easily, the character/graphic information network system can even provide an information updating service for giving real-time updated meteorological information such as a rainfall intensity, a water level, etc. Providing the users with such real-time updated meteorological information is highly vauable among other information retrieval services. It is expected that such meteorological information will be requested highly frequently especially when a large storm such as a typhoon or hurricane is about to come.

In some countries such as Japan, storms and floods tend to result in disasters since the rivers are relatively short and since there are many mountainous landscapes, as well as since Japan is geographically located such that it is usually hit by many tropical cyclones. In order to safeguard against calamities from storms and floods, it is increasingly important in such countries to provide a quick service of giving detailed information relative to the basins of rivers. The character/graphic information network system such as a videotex information system, as described above, has started to provide quick information on rivers for the purpose of protecting people from natural disasters.

It is also very important in other countries such as the United States of America, Canada, etc. to provide quick information regarding river basins in terms of rainfall depths or the like so that unwanted disasters can be prevented from happening.

Generally, the present character/graphic information network systems include information receiving systems, described below, for a user to receive a plurality of information images from the information center. According to one receiving system, the user enters a number (e.g., a 9-digit number) corresponding to a desired image (hereinafter referred to as an "image number") through the keyboard of his terminal, which sends the image number to the information center to get desired image information. According to another receiving system. many menus are received by the terminal, and a desired item of image information is selected from a range of items of image information which are successively displayed on the display unit. The former direct retrieval system is disadvantageous in that the user has to either memorize the image number corresponding to the desired image information or find the image number from an index table. The problems with the latter indirect retrieval system are that the terminal has to communicate with the information center each time a menu is to be called resulting in a time-consuming process, and the time needed to display the menus is long since they are successively displayed on the display unit at the terminal.

The above disadvantages of the conventional information receiving systems may cause serious problems especially in emergencies. More specifically, when a warning to take refuge from a heavy rainfall or a flood is issued or when there is an impending danger of a river overflowing in its banks, if the information center is occupied by one terminal for a long period of time, then it cannot be accessed by the other terminals for meteorological and hydrological information. This is problematic because necessary information should quickly be sent to as many user's terminals as possible in case of emergency. Should the meteorological and hydrological information be delayed due to the limitations of the prior information receiving systems, available countermeasures against a possible disaster such as a flood can also be delayed, and as a result such a disaster may not be avoided.

It is preferable that various warnings and information on rivers be timely received and given to the public. It is therefore desirable that information receiving terminals for receiving and displaying information images be positioned in public places such as the lobbies of government office buildings, hotels, banks, and other public buildings, department stores, and open spaces such as those before railroad stations.

Since the direct and indirect retrieval systems, referred to above, require terminals to be manually operated by the users who want to be serviced, they are not convenient for use in public places and are also not suitable for giving image information to many people simultaneously.

SUMMARY OF THE INVENTION

It is a general object of the present invention to provide an automatic information receiving terminal device for use in a character/graphic information network system which employs a videotex communication network or a public communication network (telephone network), the terminal device being connected to an information center through a public communication network (telephone network) so that various items of image information from the information center can be received by the terminal device, the terminal device having a clock means and a time setting means, the arrangement being such that the terminal device can automatically receive or reproduce desired information at an each time preset by the time setting means, so that the terminal device can automatically be operated without manual intervention so as to give emergency information or the like timely to a number of people.

Another object of the present invention is to provide an automatic information receiving terminal device for use in a character/graphic information network system including a videotex communication network or a public communication network, comprising clock means for generating time data, time setting means for presetting a time with respect to said time data, start control means for automatically starting to operate the automatic information receiving terminal device at the time preset by said time setting means, operation schedule setting means for presetting an operation schedule, and processing means for automatically operating the automatic information receiving terminal device according to the operation sequence preset by said operation schedule setting means.

Still another object of the present invention is to provide the automatic information receiving terminal device further including display means for displaying image information and memory means for storing image information, said operation schedule setting means comprising connecting means for connecting the automatic information receiving terminal device to an information center at a prescribed time, and request means for presetting a sequence of items of image information to be received from the information center and times at which said items of image information are to be received, said processing means comprising means for receiving the items of image information from the information center in the sequence preset by said request means and for displaying the received items of image information on said display means and/or storing the received items of image information in said memory means.

Yet another object of the present invention is to provide the automatic information receiving terminal device wherein said operation schedule setting means includes image information reproduction sequence setting means for presetting a sequence of items of information to be reproduced, said processing means further comprising means for reading the items of image information and/or speech messages associated therewith from said memory means and for displaying said items of image information on said display means and/or reproducing said speech messages according to the sequence preset by said image information reproduction sequence setting means.

Yet still another object of the present invention is to provide the automatic information receiving terminal device wherein said operation schedule setting means further includes interrupt control means, responsive to an interrupt command, an input signal indicating an item of image information, and/or an input signal indicating a speech message, for reading the indicated item of image information and/or the indicated speech message from said memory means and for displaying said item of image information and/or reproducing said speech message while interrupting said sequence.

A further object of the present invention is to provide an automatic information receiving terminal device for use in a character/graphic information network system including a videotex communication network or a public communication network, comprising clock means for generating time data, time setting means for presetting a time with respect to said time data, power supply means for energizing said clock means at all times and the automatic information receiving terminal device, and start control means for automatically enabling said power supply means to operate the automatic information receiving terminal device at the time preset by said time setting means.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a table of automatic requests which are registered in presetting an operation schedule;

DESCRIPTION OF THE PREFERRED EMBODIMENT

Figure 1:
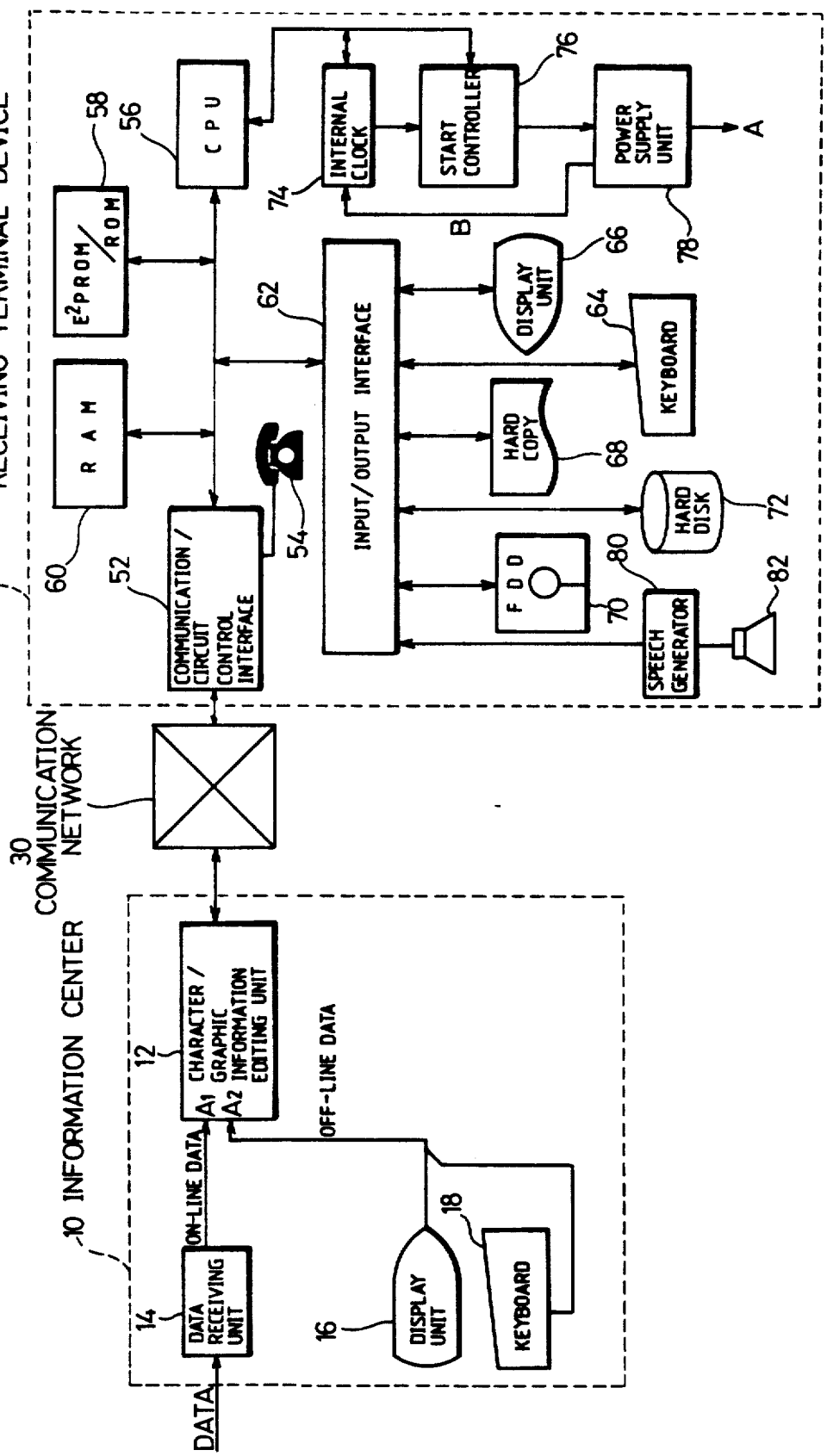
FIG. 1 is a block diagram of a character/graphic information network system which employs an automatic information receiving terminal device according to the present invention.

FIG. 1 shows in block form a character/graphic information network system for giving requested information to subscribers, the character/graphic information network system utilizing a videotex communication network and incorporating an automatic information receiving terminal device according to the present invention. The character/graphic information network system services the subscribers only after it has given information on its available services to potential subscribers and registered those who applied for the services as subscribers.

As shown in FIG. 1, the character/graphic information network system basically comprises an information center 10, a communication network 30 such as a videotex communication network or public communication network (telephone network), and an automatic information receiving terminal device 50.

The information center 10 includes a character/graphic information editing unit 12 having an on-line input terminal A supplied with on-line data such as time-rainfall depth data and river water level data from a radar rainfall depth detector and a telemeter (not shown) through a data receiving unit 14, and an off-line input terminal A supplied with off-line data such as of a warning message in emergency through a display unit 16 and a keyboard 18.

These on-line and off-line data are converted by the character/graphic information editing unit 12 to image data which are then transmitted to the communication network 30. The output terminal of the character/- graphic information editing unit 12 is connected to one terminal of the communication network 30 through a communication controller and a modulator/demodulator (both not shown).

The opposite terminal of the communication network 30 is connected through a modulator/demodulator (not shown) to a communication/circuit control interface 52, including a communication controller (not shown), in the automatic information receiving terminal device 50. The communication/circuit control interface 52 has a first terminal coupled to a telephone set 54 and a second terminal coupled through a bus to a CPU (central processing unit) 56, a ROM (read-only memory) 58 including an E'PROM, a RAM (random access memory) 60, and an input/output interface 62.

The input/output interface 62 is connected to various input and output units such as a keyboard 64, a display unit 66, a hard copy reproducing unit 68, a floppy disk 70 as a memory, and a speech generator 80 which is in turn connected to a speech output unit 82 such as a speaker.

The automatic information receiving terminal device 50 further includes an internal clock 74, or a clock means, comprising a quartz oscillator, etc. The E'PROM 58 stores times for starting and stopping the operation of the automatic information receiving terminal device 50, which have been entered through the keyboard 64. The $E^2$PROM 58 is thus used as a time setting means. A start controller 76 controls a power supply unit 78 to trigger the automatic information receiving terminal device 50 into and out of operation. The hard disk 72 or the $E^2$PROM 58 is used as an operation schedule setting means which registers a schedule of automatic operation of the automatic information receiving terminal device 50. The power supply unit 78 produces two power supply outputs A, B. The power supply output B is always enabled and supplied to the internal clock 74. The power supply output A is enabled only when the terminal device 50 is in operation, and is supplied to the various components of the automatic information receiving terminal device 50.

Operation and advantages of the character/graphic information network system including the automatic information receiving terminal device 50, which is of basically the above construction, will be described below.

As shown in FIG. 1, the character/graphic information network system is a center-to-end, interactive image information retrieval system, and operates as follows:

The user operates the keyboard 64 to call an available circuit in the communication network 30. If the communication network 30 is available and it is accessed, the user requests a desired image display through the keyboard 64. In this connection, if data representing shortened key operations for image display request numbers have not been registered, then a 9-digit image display request code for each image display must be entered through the keyboard 64. When an image display code signal is sent from the keyboard 64 to the input/output interface 62, the CPU 56 converts the image display code signal to a data format according to an international standard protocol, and sends an output signal of that data format through the communication/circuit control interface 52 to the communication network 30.

When the request signal is applied through the communication network 30 to the character/graphic information editing unit 12, a computer in the character/graphic information editing unit 12 searches a data base in the unit 12, and selects image information corresponding to the request signal. The selected image information is then delivered through the communication network 30 and the communication/circuit control interface 52 and stored in the RAM 60. The selected image information is also fed through the input/output interface 62 and displayed on the display unit 66. After the image information has been stored in the RAM 60, the circuit in the communication network 30 is cut off, and the user can get a hard copy of the image information from the hard copy producing unit 68 or store the image information on the floppy disk 70 or the hard disk 72.

Figure 2:
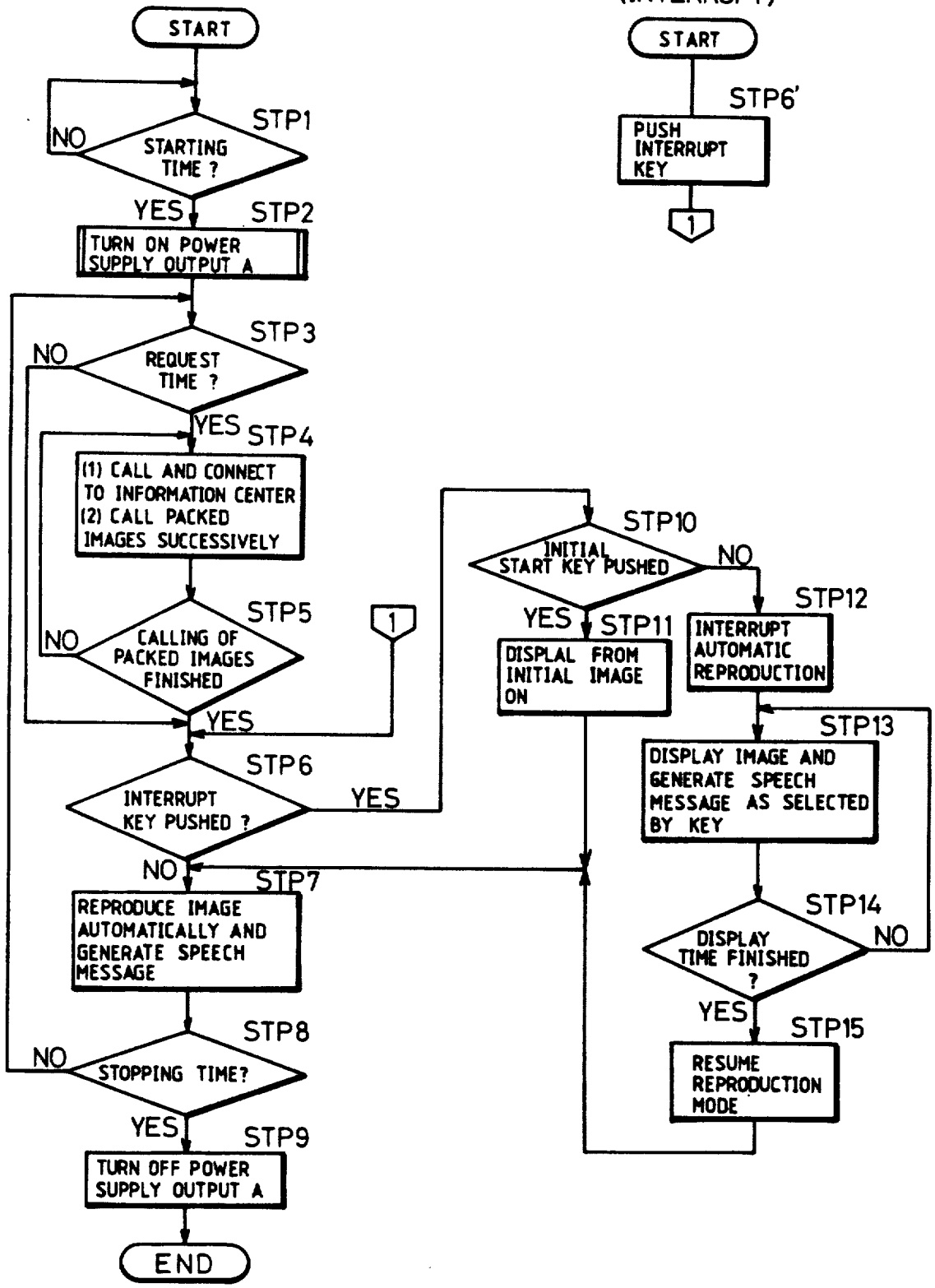
FIG. 2 is a of an operation sequence of the automatic receiving terminal device.

Various automatic processes such as automatic starting of the automatic information receiving terminal device 50 at preset times will be described below with reference to the flowchart of FIG. 2.

A time for starting or stopping the operation of the automatic information receiving terminal device 50 is entered through the keyboard 64 and stored in the $E^2$PROM 58. The starting time is time at which the automatic information receiving terminal device 50 is switched into operation, whereas the stopping time is a time at which the automatic information receiving terminal device 50 is switched out of operation.

The clock time indicated by the internal clock 74 is periodically entered into the CPU 56. If the automatic information receiving terminal device 50 is in operation, then the entered clock time is compared with the next stopping time which has been preset in the $E^2$PROM in a step 8. If the clock time has reached the preset stopping time, then the CPU 56 applies a stopping signal to the starting controller 76, and reads the next starting time which has been preset in the $E^2$PROM 58 and stores the next starting time in the internal clock 74. In response to the stopping signal, the starting controller 76 controls the power supply unit 78 to cut off the supply of the power supply output A to the various components of the automatic information receiving terminal device 50, except that the power supply output B is continuously supplied to the internal clock 74. Therefore, the internal clock 74 remains energized even while the automatic information receiving terminal device 50 is out of operation. If the clock time has reached the preset starting time in a step 1, then the internal clock 74 sends a starting signal to the starting controller 76 to turn on the power supply unit 78, which applies the power supply output A to the various components of the automatic information receiving terminal device 50. When the power supply output A is thus applied, the CPU 56 is energized, and continues to detect the preset stopping time (step 8). The above process indicates an automatic starting/stopping function of the automatic information receiving terminal device 50.

Various automatic processes such as for an automatic request will be described below.

Items of image information to be received from the information center 10 at preset times can be preset and registered using the keyboard 64 and the display unit 66. The preset data are stored through the input/output interface 62 into the hard disk 72 under the control of the CPU 56. Thus, the hard disk 72 serves as a means for setting an operation schedule, and includes a request means. The hard disk 72 therefore stores the operation schedule to be executed for the automatic information receiving terminal device 50 to automatically request the information center 10 for desired image information and receive the requested image information.

In a step 3, the CPU 56 reads the clock time of the internal clock 74 and compares the clock time with a preset request time stored on the hard disk 72. If a preset request time is reached, then the automatic information receiving terminal device 50 is connected to the information center 10 according to a connecting program stored in the E²PROM 58 in a step 4. When the terminal device 50 is connected to the information center 10, image numbers stored on the hard disk 72 are successively transmitted to the information center 10 as requests for image information also in the step 4. In response to the applied requests, the information center 10 delivers the requested items of image information which are then stored on the hard disk 72. At the same time, the received items of image information may be successively displayed on the display unit 66 so that the user can monitor the received items of image information. The step 4 is repeated until a desired number of packs are called in a step 5.

Figures 4, 5:
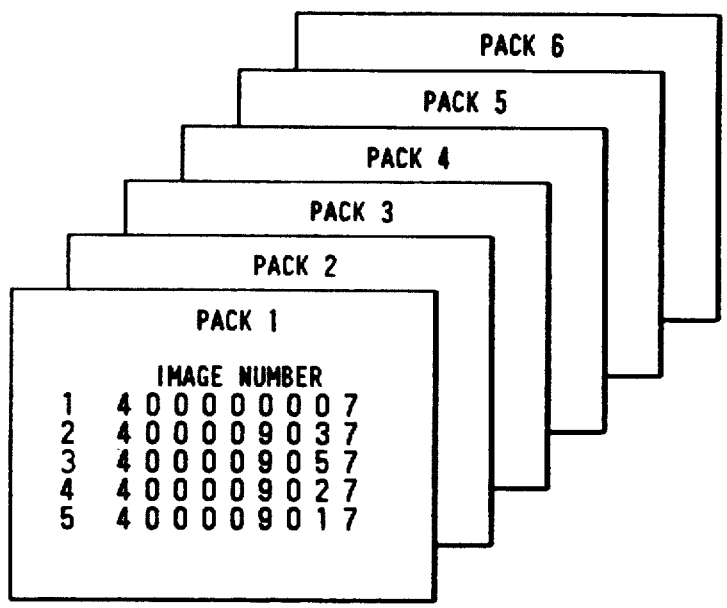
FIG. 4 is a diagram showing the relationship between a group of of image information and image numbers for the requests shown in FIG. 3.
FIG. 5 is a table of image information file numbers, speech message numbers, and a reproduction sequence stored on a hard disk.

As many as 24 requests per day, for example, can be preset and registered as shown in FIG. 3, and respective times for making such requests (request times) can also be preset. At one preset time for making a request, three packs of image information ca be preset at maximum. Each pack of image information can include, as shown in FIG. 4, up to 5 preset image numbers. Therefore, image information relative to 15 images at maximum can be received from the information center 10 and stored on the hard disk 71 upon one automatic request.

Each request time can be preset and registered in minutes, according to a new image generation time depending on the updating of on-line service data in the information center 10, so that latest image information can be received from the information center 10. It is possible to preset automatic request times at respective information receiving terminal devices, so that the loads imposed on the information center by such respective information receiving terminal devices will be averaged.

The items of image information which are stored on the hard disk 72 by the above automatic requesting process are allotted respective file numbers which allow image information to be automatically reproduced sequentially. The file numbers are available up to 42, for example. Image information which is stored on the floppy disk 70 off-line can also be stored on the hard disk 72.

A process of automatically reproducing image information at a preset time will be described below.

Items of image information received from the information center 10 upon an automatic request are stored on the hard disk 72 in the automatic information receiving terminal device 50. In order to display these items of image information on the display unit 66 in a desired sequence, a reproduction sequence and file numbers (i.e., the file numbers of the items of image information on the hard disk 72) have been entered in advance through the keyboard 64, and the reproduction sequence and the file numbers thus entered have been stored in advance as a reproduction sequence register table on the hard disk 72, which serves as a means for setting an image information reproduction sequence. Time intervals at which image information is to be reproduced have been entered in advance through the keyboard 64 into the E²PROM 58. The reproduction sequence register table also includes speech message numbers which allow the speech output unit 82 to produce voice sounds to explain the received items of image information as they are displayed.

When the CPU 56 is energized, it reads the image reproduction sequence register table from the hard disk 72, i.e., the sequence in which to reproduce the items of image information, and stores the sequence in the RAM 60. Then, in a step 7, the CPU 56 reads the items of image information which are allotted their respective file numbers from the hard disk 72 in the preset sequence stored in the RAM 60 at the time intervals stored in the E'PROM 58 and then displays the items of image information on the display unit 66. When the speech message number corresponding to a certain file number is read from the hard disk 72 and sent to the speech generator 80, the speech generator 80 applies a signal representing a speech message corresponding to the speech message number to the speech output unit 82, which then automatically produces a voice sound to explain the image information displayed on the display unit 66. When one item of image information has been displayed and its explanation through the voice sound is over, the above process is repeated to display the other items of information and explain them with speech sounds in the preset sequence. Therefore, desired items of image information can automatically be displayed by presetting a sequence and intervals with which the items of image information are to be reproduced, according to the sequence and story which are desired by the user of the automatic information receiving terminal device 50.

The image reproduction sequence register table shown in FIG. 5 contains images preset by automatic requests and image information stored on the hard disk 72 off-line, as well as the reproduction sequence. These items of image information can be preset independently of the sequence in which the automatic requests have been made, so that a reproduction sequence which gives the user a certain story can be preset. The image information preset off-line is indicative of an explanation of requested images or an explanation of the automatic information receiving terminal device 50. The off-line image information which has been stored o the floppy disk 70 can be stored on the hard disk 72.

As described above, the CPU 66 usually reads items of image information successively from the hard disk 72 according to the image reproduction sequence register table, and automatically displays them on the display unit 66. However, as indicated by a step 6', an interrupt key on the keyboard 64 may be depressed to cause an interrupt so that any image information desired by the user may be displayed on the display unit 66 irrespective of the preset image reproduction sequence.

The user depresses the interrupt key on the keyboard 64. If an interrupt is determined in a step 6, then a step 10 determines whether an initial start key is depressed or not. If not, then the automatic reproduction process is interrupted in a step 12. The user then enters a file number to be displayed and a speech message number corresponding to the file number through the keyboard 64. The CPU 56 reads the image information corresponding to the entered file number and speech message number from the hard disk 72. The CPU 56 serves as an interrupt control means, and controls the display unit 66 to display the image information and also controls the speech output unit 82 to reproduce the speech message in voice sounds.

After the display, if the predetermined display interval has elapsed in a step 14, then CPU 56 displays the image information immediately before the interrupt has been caused in a step 15. Thereafter, the automatic reproduction process in the sequence according to the image reproduction sequence register table is continued. If an initial start key is depressed in the step 10, then the images are successively displayed from the initial image on in accordance with the image reproduction sequence register table.

With the present invention, as described above, the automatic information receiving terminal device in the character/graphic information network system utilizes a videotex communication network or a public communication network (telephone network) and comprises a clock means, a time setting means, a start control means, and an operation schedule setting means. The start control means automatically starts the automatic information receiving terminal device at a time preset by the time setting means, and a desired process is automatically carried out according to a schedule preset by the operation schedule setting means. The operation schedule setting means includes a connecting means and a request means for presetting desired items of image information to be supplied from an information center and a time at which the desired items of image information are to be received. The automatic information receiving terminal device and the information center are connected at a preset time by the connecting means, and the desired items of image information are successively received from the information center according to a sequence set by the request means and displayed on a display means and/or stored in a memory means.

The operation schedule setting means includes an image information reproduction sequence setting means. The items of image information and speech messages which have been read from the information center and stored in the memory means are read, displayed, and reproduced in voice sounds according to a sequence preset by the image information reproduction sequence setting means.

The automatic information receiving terminal device can be started and stopped in operation at a time which has been preset by the user, and can also receive desired image information at a desired time by an automatic request. The automatic information receiving terminal device can also automatically reproduce items of image information according to a preset sequence. The automatic information receiving terminal device offers the following advantages:

The automatic information receiving terminal device can automatically be started in operation at a preset time. This feature results in the following advantages:

(1) The use does not miss desired information which would otherwise be skipped when the user forgets to switch on the terminal device.

(2) Electric and telephonic expenses can be reduced because the automatic information receiving terminal device can be automatically shut off at a desired preset time, and (3) Because the automatic information receiving terminal device is automatically shut off at a preset time, the information center can be accessed by other terminal devices more frequently, the burden on the information center is reduced, and the capacity of the information center can economically be utilized.

The automatic information receiving terminal device can automatically be started by the internal clock at a desired request time for a desired image. In view of this feature, the following merits are offered:

(4) The loads which would otherwise be placed on the information center by simultaneous requests from a number terminal devices may be dispersed by varying request times, resulting in a reduction in the communication time. As each terminal device stores desired information received from the information center, the terminal device is not subsequently required to access the information center. Therefore, the capacity of the information center can economically be utilized.

(5) The user of the terminal device can see a desired image and listen to an explanation relative to the image in voice sounds at any desired time. This allows the information displayed on the display unit to be quickly and accurately understood by a number of unspecified people.

(6) The user is given an opportunity to see images at all times and gets used to displayed information. In case of an emergency such as a possible disaster, the user can quickly recognize an unusual message contained in the displayed information, and hence can take suitable action against the possible disaster.

(7) As no manual intervention is needed, desired information can economically be obtained.

(8) Lack of manual intervention allows the automatic information receiving terminal device to be positioned in public places such as open spaces before railroad stations, department buildings, hotel and bank lobbies, etc., so that real-time information is made available to many and unspecified people.

Images which have been automatically requested and filed are automatically reproduced in a desired sequence. This feature offers the following advantages:

(9) A number of images may be arranged based on a certain story so that items of information about the prevention of disasters can be presented in a related fashion. The information presented in this manner can well be understood by the user.

(10) Any information can be presented effectively.

Images which have been automatically requested and filed can be reproduced by an interrupt command even during an automatic reproduction mode. According to this feature, the following advantages are given:

(11) The user can freely see any filed image which he strongly wants and listen to its explanation in speech.

(12) Information can be reproduced in a sequence based on a story established by the user.

(13) The terminal device can meet the needs of specified users as well as many and unspecified users.

Although a certain preferred embodiment has been shown and described, it should be understood that many changes and modifications may be made therein without departing from the scope of the appended claims.

What is claimed is:

1. An automatic information receiving terminal device connectable to an information center through a character/graphic information network system including at least one of a videotex communication network and a public communication network, said information center having stored therein a plurality of updated character/graphic information items, said receiving terminal device comprising:

clock means for generating time data;

time setting means for presetting a time with respect to said time data;

start control means for automatically starting to operate the automatic information receiving terminal device at the time preset by said time setting means;

operation schedule setting means for presetting an operation schedule comprising a plurality of predetermined request times, and for presetting identification data for requesting at least one of said information items from said information center at each of said request times;

storage means for storing said information items;

connecting means for connecting the automatic information receiving terminal device to said information center; and processing means, responsive to a signal from said start control means, for automatically operating said operation schedule setting means to fetch said identification data corresponding to said request times, (b) issuing a request based on said identification data after said automatic information receiving terminal has connected to said information center, (c) receiving said information items from said information center and storing the received information items in said storage means, and (d) presetting a subsequent time in said time setting means.

2. The automatic information receiving terminal device according to claim 1, wherein said information items include image information, wherein said automatic information receiving terminal further comprises display means for displaying said image information, and wherein said processing means further comprises means for receiving said image information from the information center at said predetermined request times and at least one of means for displaying said image information on said display means and means for storing said image information in said storage means.

3. The automatic information receiving terminal device according to claim 2, wherein said operation schedule setting means includes image information reproduction sequence setting means for presetting a sequence of image information items to be reproduced, and wherein said processing means further comprises means for reading the image information items from said storage means and for displaying said image information items on said display means according to the sequence present by said image information reproduction sequence setting means.

4. The automatic information receiving terminal device according to claim 3, wherein said information items further include speech messages associated with said image information items, and where said processing means further comprises means for reading said speech messages from said storage means and reproducing said speech messages when displaying said image information items.

5. The automatic information receiving terminal device according to claim 3, wherein said operation schedule setting means further comprises interrupt control means responsive to an interrupt command, and at least one of an input signal indicating an image information items and an input signal indicating a speech message, said operation schedule setting means reading at least one of an indicated image information item and an indicated speech message from said storage means and further including at least one of means for displaying said image information item and means for reproducing said speech message while interrupting said sequence preset by said image information reproduction sequence setting means.

6. The automatic information receiving terminal device according to claim 1, wherein said operation schedule setting means further comprises means for registering said predetermined request times and said identification data corresponding to said request times in a table of automatic requests, said identification data comprising at least one pack number for requesting a pack including a plurality of information numbers corresponding to respective information items.

7. The automatic information receiving terminal device according to claim 1, wherein said received information items are allotted respective file numbers and stored in said storage means.

8. The automatic information receiving device according to claim 1, wherein said received information items comprises image information.

* * * * *